May 1, 1923.

L. LOOK

TRACTOR OR TRUCK WHEEL

Filed April 17, 1922

Witnesses:
W. F. Kilroy
Harry R. L. White

Inventor
Louis Look

May 1, 1923.
L. LOOK
TRACTOR OR TRUCK WHEEL
Filed April 17, 1922
1,453,686
2 Sheets-Sheet 2
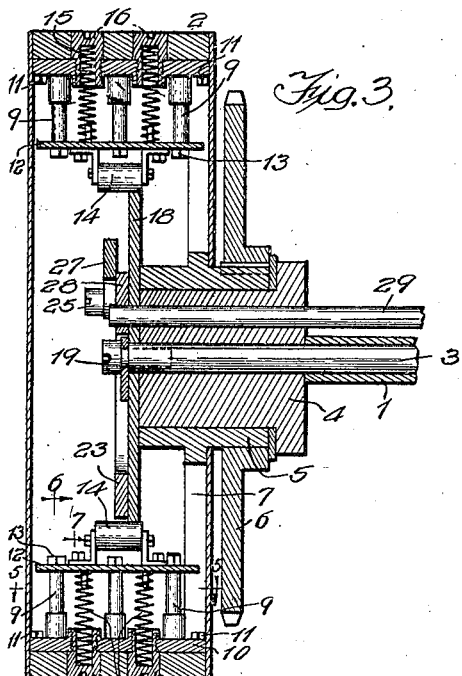
Fig. 3.
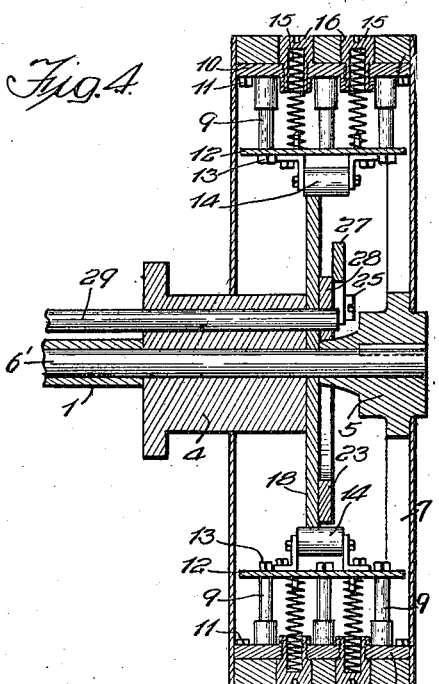
Fig. 4.
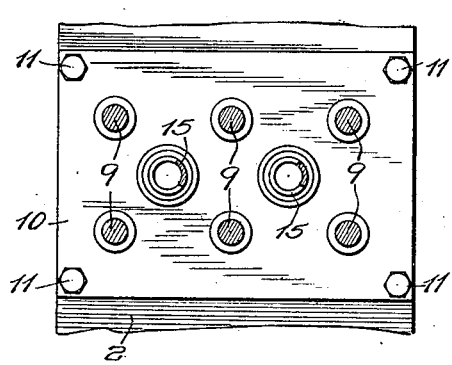
Fig. 5.
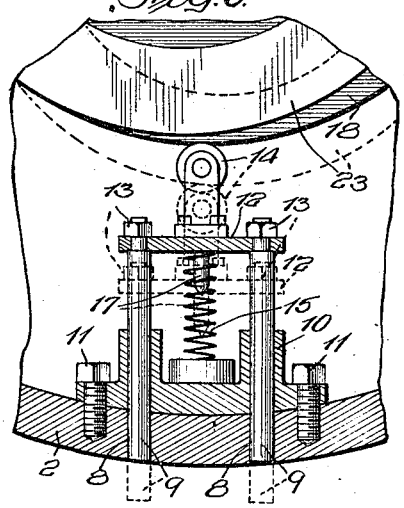
Fig. 6.
Fig. 7.
Witnesses:
W. T. Kilroy
Harry R. L. White
Inventor:
Louis Look
By Hill & Hill Attys Patented May 1, 1923.

1,453,686

UNITED STATES PATENT OFFICE.

LOUIS LOOK, OF CHICAGO, ILLINOIS.

TRACTOR OR TRUCK WHEEL.

Application filed April 17, 1922. Serial No. 554,062.

*To all whom it may concern:*

Be it known that I, LOUIS LOOK, a citizen of the United States, residing at Chicago, in the county of Cook and State of Illinois, have invented certain new and useful Improvements in a Tractor or Truck Wheel, of which the following is a description.

My invention relates to an improvement in a tractor or truck wheel, and especially to such wheels adapted for use on road building machinery or on vehicles that are likely to be transported over paved roads. One of the objects of my invention is to provide such a wheel wherein the tractive lugs may be withdrawn at will so as not to project radially beyond the rim periphery and thus will not mar or damage the surfaced roads when the wheel is moved thereover. Another object of my invention is to provide a wheel of the kind described wherein the lugs may be removed singly if so desired without the necessity of dismantling the entire wheel or all the lugs. Another object of my invention is to provide a wheel of the kind described which will operate efficiently with a full complement of lugs or with one or more of the sets of lugs removed. Another object of my invention is to provide means to adjustably limit the radial movement of the lugs at will. The invention has among its other objects the production of a device of the kind described which is simple, convenient, compact, durable, reliable, efficient and satisfactory for use wherever found applicable. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Fig. 1 is a top plan view showing my invention as applied to the driving wheels of a vehicle;

Fig. 3 is a radial section through one of the wheels;

Fig. 4 is a radial section of a modified form of wheel and drive therefor;

Fig. 5 is a section taken substantially on line 5—5 of Fig. 3;

Fig. 6 is a sectional view taken substantially on line 6—6 of Fig. 3; and

Fig. 7 is a sectional view taken substantially on line 7—7 of Fig. 3.

Figure 1:
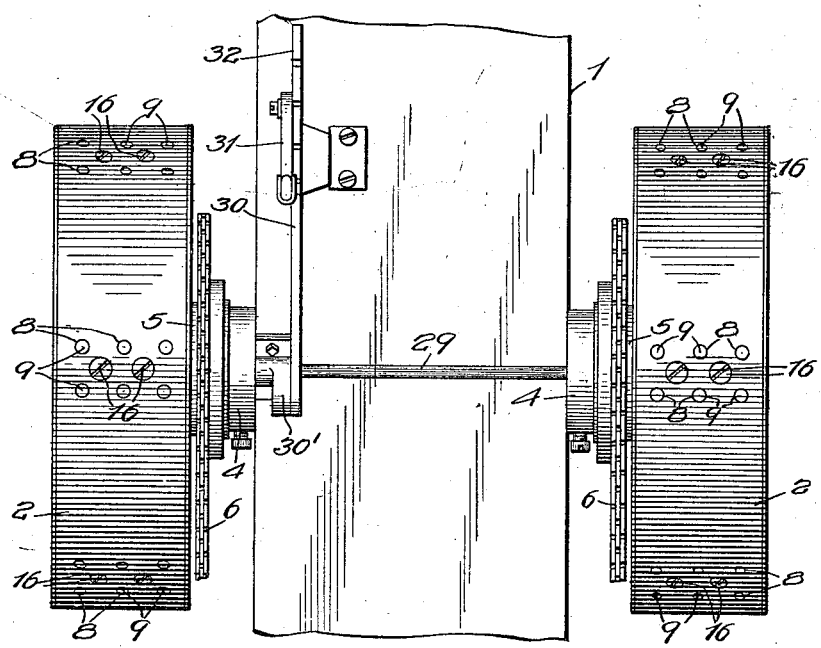

In the drawings, wherein I have illustrated the preferred embodiments of my invention, 1 indicates the frame work of a motor vehicle and 2 the driving wheels for supporting the vehicle and propelling the same. 3 indicates the supporting or stationary axle extending at each end through a stationary sleeve 4 which projects axially into the wheels 2. The wheels 2 may be of any preferred size, shape and material, and in the form shown the rim is connected to a central hub 5 by spokes 7. Any manner of drive means may be employed for rotating the wheel upon the stationary shaft, as for instance, a sprocket wheel 6, secured to the hub 5 may be driven by a chain or the like from a suitable source of power.

The peripheral surface of the wheels 2 is free of radial projections thereon and is provided with a plurality of sets of radial apertures 8 therefor at spaced points about the circumference of the wheel. Into each of the apertures 8 there is adapted to be positioned a slidable pin or lug 9 of any shape, size or material so that when the pin is moved outwardly beyond the periphery of the rim it may engage the ground and so afford traction.

In order to provide a larger bearing surface for the pin 9, parts 10 are arranged at each set of apertures 8, these parts 10 adapted to be secured to the inner surface of the rim by screws or bolts 11, or suitable or equivalent means. It is to be understood that these parts 10 may be formed integrally with the rim if so desired. A plate or carrier 12 is adapted to be positioned transversely of the inner ends of the pins of each set and to be detachably secured thereto by nuts 13 or the like. A bearing roller 14 is carried by the plate 12 for a purpose which will be hereinafter described.

Between the plate 12 and the rim there is positioned one or more springs 15, as shown, tending to yieldably move the sets of pins or lugs inwardly of the peripheral surface of the rim. A guide pin 17 may be arranged on the plate 12 to extend within the spring 15, and a cupped screw 16 may be positioned at the other end of the spring so as to be removable from the exterior surface of the rim wheel to remove the springs. Thus there are a series of units each comprising pins, a carrier, springs therebetween and a roller, any unit of the series being individually removable from the rim, as will be hereinafter described.

In order to prevent accidental withdrawal of the sets of pins, there is arranged a concentric disk 18 secured to the stationary sleeve 4 by any suitable means, as for instance, a screw 19. In this manner all of the bearing rollers 14 will ride on the periphery edge of the disk 18.

In order to remove one of the sets of pins for the purpose of renewal, inspection or the like, the disk 18 is provided with a peripheral recess or opening 20 therein. This opening is closed by a movable member 21, which when in the position shown in Fig. 2, has its outer edge flush with the circumferential surface of the disk 18. The member 21 is removably held in place by means 22. Thus to remove any of the unit set of pins, the insert 21 is first removed to uncover the recess 20 and the wheel 2 is partially rotated until the opening 20 is in radial alignment with the roller 14 of the particular set of pins desired to be removed. The springs 15 will move the pins with their carrier and roller radially inwardly into the opening 20 so that they may be easily removed as a unit.

Figure 2:
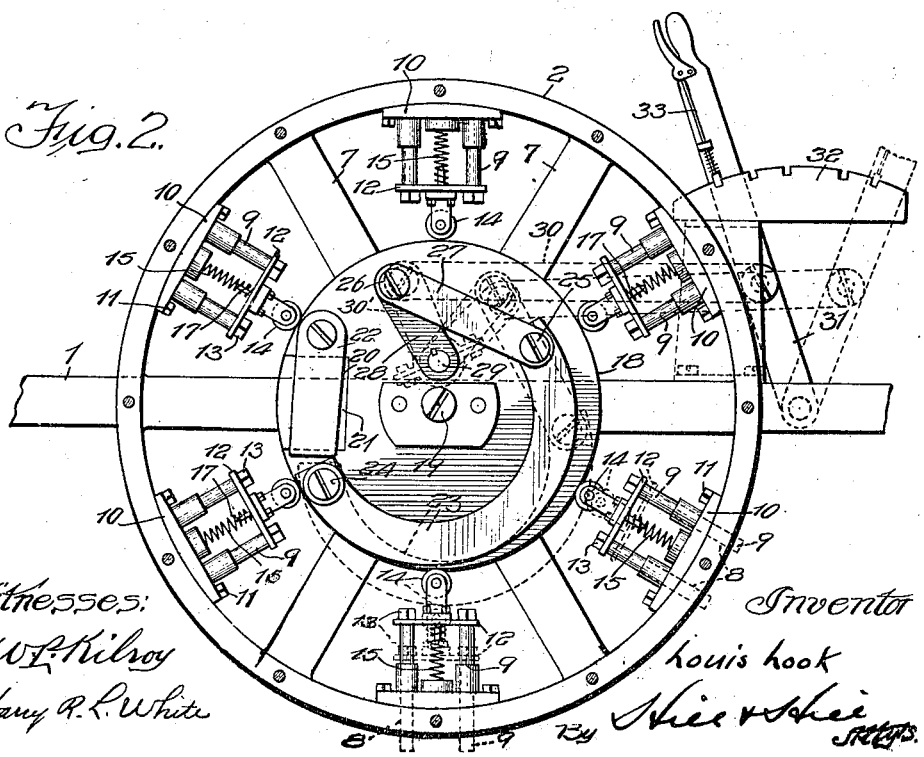
Fig. 2 is a side elevation thereof.

In order to operatively move the pins radially outwardly through the rim of the wheels to project therebeyond and engage the ground, a cam member 23 is pivoted to the disk 18 adjacent the bottom side thereof, as at 24, the other end of the cam 23 pivotally connected, as at 25, to the end of a link 27. The other end 26 of the link 27 is pivotally connected to a lever 28 fixed to a shaft 29, extending from one wheel to the other. Thus, whenever the shaft 29 is rocked, the cam 23 will be moved so that as the rollers 14 are successively engaged thereby, the sets of pins will be slidably moved through their openings in the rim radially outwardly thereof, as shown in Figs. 2 and 6.

A lever 30′, rigidly connected to the shaft 29 at one end, is pivotally connected at its other end to a link 30, which in turn is pivotally connected intermediate the ends of an operating lever 31 pivoted to a stationary part of the frame. The operating lever 31 carries a spring held pin 33 operable over a series of detents formed in a segment 32, so that the cam 23 may be adjustably held at various positions so as to adjustably limit the radial movement of the pins 9 from between their outermost position, shown in dotted lines (Fig. 1 and 6), to that position shown in full lines, wherein they do not project beyond the peripheral surface of the rim.

In the modification shown in Fig. 4, the drive for the wheel is of a slightly different type, and 6′ indicates the driven shaft secured to the hub 5 of the wheel 2. The sleeve 4 is stationary, and has secured thereto the concentric disk 18 engageable with the bearing rollers 14 of the sets of friction pins. The means for operating the cam 23 is similar to that described in connection with the previous modification, and will be understood from the description in connection therewith.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In combination with a vehicle, supporting wheels therefor free of periperal projections, lugs slidably carried by said wheels, means for engaging the inner ends of said lugs to limit their movement in one direction, cam means cooperable with said lugs, manually operable means for operating said cam means to actuate said lugs in succession to project beyond said periphery, and means for locking said last-mentioned means in various positions to adjustably limit the movement of the lugs.

2. In combination with a vehicle, a pair of supporting wheels, a series of pins slidable radially through the rim wall of said wheels, a stationary disc operatively engageable with the pins to prevent their accidental withdrawal from the rim wall, a cam carried on said disc and operatively engageable with said pins in succession to actuate them radially through said wheel rim, and means for detachably locking said cam to adjustably limit the outward radial movement of said pins.

3. In combination with a vehicle, a pair of supporting wheels, a series of pins slidable radially through the rim wall of said wheels, a stationary concentric disc operatively engageable with the pins to prevent their accidental withdrawal from the rim wall and having a radial recess in its periphery, an insert fitting into said recess flush with the disc periphery, means for removably holding said insert in place whereby it may be removed to permit one of said pins to be withdrawn radially inwardly from the rim, a cam carried on said disc and operatively engageable with said pins in succession to actuate them radially through said wheel rim and means for detachably locking said cam to adjustably limit the outward radial movement of said pins.

4. In combination with a vehicle, a pair of supporting wheels free of projections on the rim periphery, a series of pins slidable radially through the rim wall of said wheels, springs for normally maintaining said pins inwardly of the rim periphery, a stationary concentric disc operatively engageable with the pins to prevent their accidental withdrawal from the rim wall and having a radial recess in its periphery, an insert fitting into said recess flush with the disc periphery, means for removably holding said insert in place whereby it may be removed to permit one of said pins to be withdrawn radially inwardly from the rim and a cam carried on said disc and operatively engageable with said pins in succession to actuate them radially through said wheel rim, and means for detachably locking said cam to adjustably limit the outward radial movement of said pins.

5. In combination with a vehicle, a pair of supporting wheels, a series of sets of radial pins spaced circumferentially of the rim of said wheels, each of said set of pins comprising a plurality of pins, a carrier therefor and a spring between said rim and carrier to yieldably maintain said pins inwardly of the rim periphery, a concentric stationary disc operably engageable with said carriers to prevent the accidental withdrawal of the pins from the rim, a cam on said stationary disc and operably engageable with said carriers successively, links connected to one end of said cam, a rock shaft connected to said links, and an operating lever connected to said shaft whereby said cam may be actuated to actuate said pins in succession.

6. In combination with a vehicle, a pair of supporting wheels, a series of sets of radial pins spaced circumferentially of the rim of said wheels, each of said set of pins comprising a plurality of pins, a carrier therefor, and a spring between said rim and carrier to yieldably maintain said pins inwardly of the rim periphery, a concentric stationary disc operably engageable with said carriers to prevent the accidenal withdrawal of the pins from the rim, a cam on said stationary disc and operably engageable with said carriers successively, and means for adjusting said cam to actuate said pins in succession and adjustably vary the limit of radial movement of said pins.

7. In combination with a vehicle, a pair of supporting wheels, a series of sets of radial pins spaced circumferentially of the rim of said wheels, each of said set of pins comprising a plurality of pins, a carrier therefor, a bearing roller carried by said carrier, and a spring between said rim and carrier to yieldably maintain said pins inwardly of the rim periphery, a concentric stationary disc engageable with all of said rollers to prevent the accidental withdrawal of the pins from the rim, a cam pivoted on said stationary disc and engageable with said rollers successively, and means for adjusting said cam to actuate said pins and adjustably vary their limit of radial movement.

8. In combination with a vehicle, a pair of supporting wheels, a series of sets of pins spaced circumferentially of and slidable radially of the rim of said wheels, each of said sets comprising a plurality of pins and a carrier therefor, and means for normally yieldably maintaining said sets inwardly of the rim periphery, comprising a stationary disc operably engageable with said carriers to prevent the accidental withdrawal of the pins, and having a recess in its peripheral edge and means for normally closing said recess, whereby said last mentioned means may be operated to open said recess so that the set opposite thereto may be withdrawn from the rim thereinto as a unit.

9. In combination with a vehicle, a pair of supporting wheels, a series of pins slidable radially through the rim wall of said wheels, a stationary disc operatively engageable with the pins to prevent their accidental withdrawal from the rim wall, and a cam carried on said disc and operatively engageable with said pins in succession to actuate them radially through said wheel rim.

10. In combination with a vehicle, a pair of supporting wheels, a series of pins slidable radially through the rim wall of said wheels, a stationary concentric disc normally engageable with the pins to prevent their accidental withdrawal from the rim wall and having a radial recess in its periphery, an insert fitting into said recess flush with the periphery of the disc, means for removably holding said insert in place, whereby it may be removed to permit one of said pins to be withdrawn radially inwardly from the rim, and means for actuating said pins in succession to move them through said wheel rim.

In testimony whereof, I have hereunto signed my name in the presence of two subscribing witnesses.

LOUIS LOOK.

Witnesses:
Roy W. Hill,
Ruth M. Ephraim.